Dec. 7, 1943.                B. A. WOINA                2,336,433
                          SEAT SLIDE STRUCTURE
                  Filed March 24, 1939           4 Sheets-Sheet 1

INVENTOR
Benjamin A. Woina.
BY
Harness, Dickey & Pierce
ATTORNEYS.

Dec. 7, 1943.  B. A. WOINA  2,336,433
SEAT SLIDE STRUCTURE
Filed March 24, 1939   4 Sheets-Sheet 2

INVENTOR
Benjamin A. Woina.
BY Harness, Dickey & Pierce.
ATTORNEYS

Patented Dec. 7, 1943

2,336,433

UNITED STATES PATENT OFFICE 2,336,433

SEAT SLIDE STRUCTURE

Benjamin A. Woina, Detroit, Mich., assignor to L. M. Payne Company, Detroit, Mich., a corporation of Michigan Application March 24, 1939, Serial No. 263,963

21 Claims. (Cl. 155—14)

This invention relates to seat slide structures and particularly to that type thereof applicable for adjustably supporting the front seats of automobiles, the principal object being the provision of a structure of this type that is simple in construction, efficient in operation, and economical to manufacture.

Objects of the invention include the provision of a seat slide structure having a novel form of rail and slide elements; the provision of an adjustable seat slide structure including a rail and a slide, and a novel form of means cooperating between them for supporting one with respect to the other; the provision of an adjustable seat slide structure including a rail and a slide and having a novel form of means for supporting the rail, and the slide being so constructed with respect thereto as to enable a maximum amount of sliding movement to be obtained thereby on the rail with a minimum length of rail; the provision of a seat slide structure including a pair of relatively movable parts one of which is at least partially received within the other and anti-friction elements interposed between such part and the other of said parts so as to maintain the parts in spaced relation; the provision of a seat slide structure as above described in which the anti-friction elements are maintained under a compressive stress when assembled to the slide and rail; the provision of a construction as above described in which at least a portion of the anti-friction elements are so constructed and so cooperate with the rail and guide, respectively, as to serve to maintain those parts against relative lateral displacement with respect to each other; the provision of a seat slide structure including a pair of telescopically received parts and rolling anti-friction elements interposed between the parts and serving not only to maintain them in constantly spaced relation to one another vertically but also in a horizontal direction; the provision of a seat slide structure of the type described including a rail and a slide formed from sheet metal into novel cross-sectional configuration; and the provision of a seat slide structure having a novel form of cage element for the rolling anti-friction elements between the rail and the slide thereof.

Other objects of the invention include the provision of a seat slide structure having a novel form of latching mechanism incorporated therewith; the provision of a seat slide structure having a rail element formed in a novel manner for cooperation with a latching mechanism; the provision of a latch mechanism for a seat slide structure and a cooperating latching structure adapted to exert a wedge-like action between the slide and the rail thereof when in latched position to effectively prevent any looseness between the slide and the rail when latched; and the provision of a seat slide mechanism and cooperating latching mechanism for adjustable seats including a pair of slidably adjustable supporting structures at adjacent opposite sides of the seats together with a single manual control for the latching mechanism of each of the supporting structures, the latching mechanism for the support opposite the manual control means being so constructed and arranged as to insure latching of the corresponding supporting member in spite of transverse mis-alignment of the two opposite sides of the seat at the moment the latching mechanism is rendered operative.

The above being among the objects of the present invention the same consists in certain novel features of construction and combinations of parts to be hereinafter described with reference to the accompanying drawings, and then claimed, having the above and other objects in view.

In the accompanying drawings which illustrate suitable embodiments of the present invention and in which like numerals refer to like parts throughout the several different views.

Fig. 6 is an enlarged transverse sectional view taken on the line 6—6 of Fig. 3;

Fig. 7 is an enlarged transverse sectional view taken on the line 7—7 of Fig. 3;

Fig. 8 is a fragmentary vertical sectional view taken through the structure shown in the preceding figures and as on the line 8—8 of Fig. 4;

Figure 1:
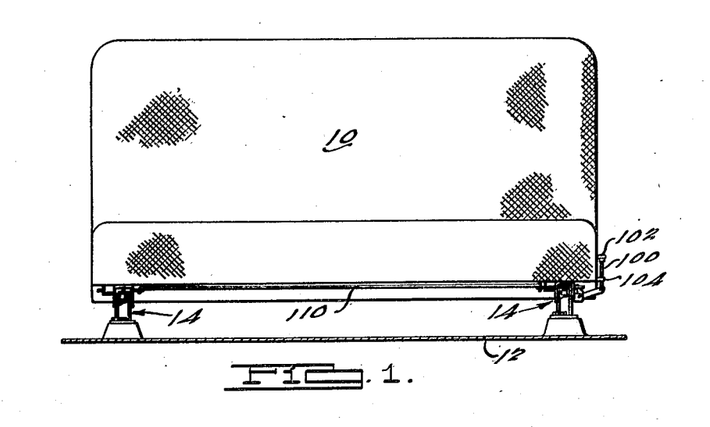
Fig. 1 is a front elevational view of the front seat of an automobile slidably supported from a floor by a pair of slidable supports constructed in accordance with the present invention.

Referring to the drawings and particularly to Fig. 1, a conventional seat is indicated generally at 10 of a type commonly employed as the driver's seat of an automobile. The seat 10 is supported upon the floor 12 by means of a pair of supporting devices indicated generally at 14, one positioned adjacent each side of the seat 10 and extending in approximate parallelism with respect to the corresponding side thereof and in parallelism to each other. The supporting devices 14 are substantially identical to each other in construction except for the details hereinafter to be specifically pointed out and relating particularly to the latching mechanism therefor and consequently a description of one of the supporting devices will suffice as a description of both such devices except for the details hereinafter specifically pointed out. Inasmuch as the latch operating mechanism is carried by the righthand supporting device 14, this device will be described in detail and suffice as a description of the major feature of both of the devices.

Figures 1, 2, 3, 4, 5:
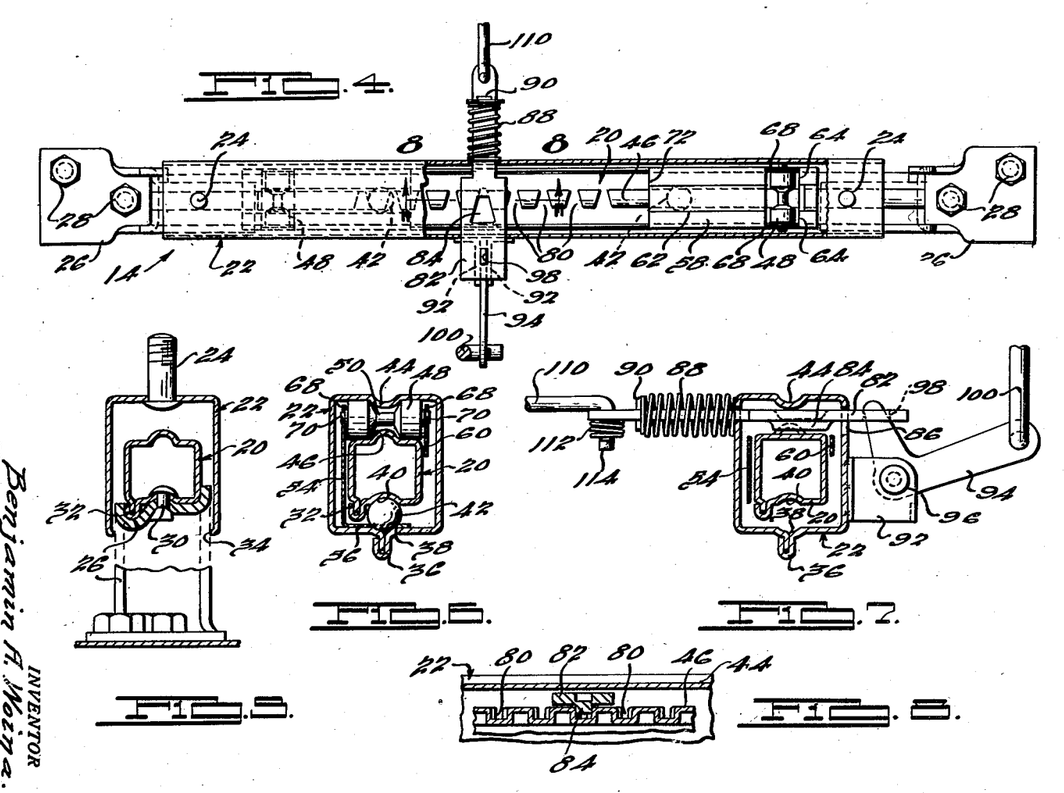
Fig. 2 is a side elevational view of the seat shown in Fig. 1.
Fig. 3 is an enlarged, partially broken, partially sectioned side elevational view of the right-hand seat support illustrated in Fig. 1.
Fig. 4 is a partially broken, partially sectioned plan view taken on the line 4—4 of Fig. 3.
Fig. 5 is an enlarged vertical sectional view taken transversely through the structure shown in Fig. 3 as on the line 5—5 thereof.
Figure 2:
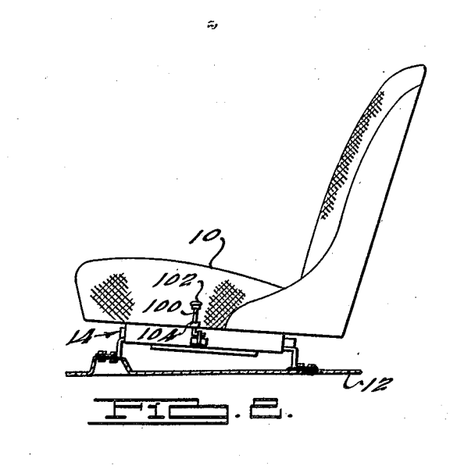
Figure 3:
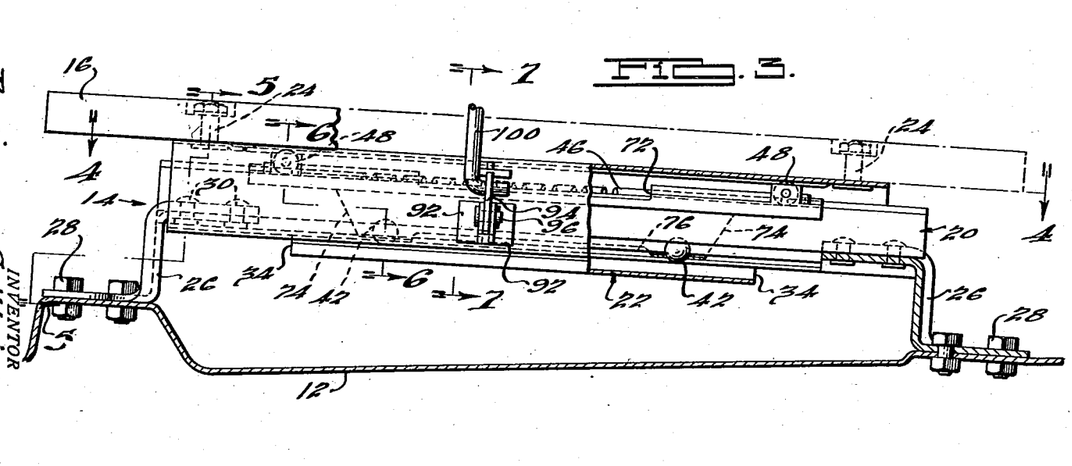

Referring to Fig. 3 it will be noted and understood that the seat 10 is provided with the usual rigid seat bottom frame 16 indicated in Fig. 3 only, and that the supporting device 14 is interposed between the frame 16 and the floor 12. The supporting device 14 includes a supporting part or rail 20 adapted to be fixed relative to the floor 12, and a slide 22 adapted to be fixed to the seat bottom frame 16 as by means of screw 24. Both the members 20 and 22 are of tubular construction and, as perhaps best seen in Fig. 6, are of approximately rectangular cross-sectional configuration, the rail 20 being telescopically received within the slide 22 in generally spaced relation to all of the walls thereof. In the construction shown the rail 20 and slide 22 are of substantially the same length and the rail 20 is supported at its ends from the floor by means of brackets 26. The brackets 26 are formed from sheet metal into generally Z conformation with one flange thereof fixed to the floor by means of bolts 28 and the other flange thereof formed to generally fit or embrace the lower end portions of the rail 20 as best indicated in Figs. 3 and 5 and secured thereto by means of rivets 30.

As best indicated in Figs. 5 and 6 the rail 20 is preferably formed from sheet metal and the free edges of the sheets are brought together at the lower lefthand corner of the rail as viewed in Figs. 5 and 6 and secured together by a seam-like joint 32 forming a downwardly extending flange-like projection extending longitudinally of such edge. The upper flanges of the supports 26, as viewed in Fig. 5, are formed for contact with the bottom wall of the rail 20 and to receive the joint 32 and to embrace the outer wall of the joint 32 as well as the opposite outer wall of the rail. The spacing between the bottom walls of rail 20 and the slide 22 is sufficient to permit the upper flange of the support 26 to be received therebetween so that the slide 22 may move longitudinally of the rail 20 within the limits of movement of the bottom wall of the slide 22 between vertically extending legs of the Z-shaped support 26. In order to further increase the longitudinal movement of the slide 22 on the rail 20 in this respect, and as best brought out in Fig. 3, the bottom wall of the slide 22 is cut away as at 34 at opposite ends thereof and so as to enable the vertical legs of the support 26 to move longitudinally through the extent of the cut away portion. It will be appreciated that this feature enables the devices 14 to be made relatively short in length and yet permit a maximum amount of longitudinal slidable movement between the rails 20 and slides 22 to be obtained.

In the embodiment of the invention under discussion the slide 22 is also formed from sheet metal and the free edges of the blank from which it is formed are brought together centrally of the lower wall of the slide 22 and are joined together in a seam-like structure 36 forming a downwardly projecting flange extending longitudinally of the slide. The marginal edge portions of the sheet from which the slide 22 is formed along the lines where the two opposite edge portions of the sheet abut centrally and above the seam 36 are formed to provide a longitudinally extending upwardly opening trough or groove 38 forming a ball race disposed centrally of said lower wall of the slide 22. The lower wall of the rail 20 is formed to provide a downwardly opening groove or trough 40 centrally thereof and providing a ball race arranged in opposed relation with respect to the race 38. A ball bearing 42 is disposed between the races 38 and 40 adjacent each end of the slide 22.

The upper wall of the slide 22 is centrally formed to provide a downwardly projecting rib or bead 44 extending longitudinally thereof and the upper wall of the rail 20 is formed to provide centrally thereof an upwardly projecting bead or rib 46 extending longitudinally thereof and in opposed relation with respect to the bead or rib 44. Received between the opposed flat and parallel surfaces of the upper walls of the rail 20 and slide 22 on either side of ribs 44 and 46 is a roller 48 the central portion of which is cut away as at 50 to receive the beads or ribs 44 and 46 therein. It will be understood that it is not necessary that any attempt be made to make the cut away portion 50 of the rollers 48 conform to and fit the opposed surfaces of the beads or ribs 44 and 46 and preferably radial clearance is allowed at this point as indicated, but preferably the width of the cut away portion 50 substantially conforms to the width of the beads or ribs 44 and 46 so that the rollers 48 cooperating through these ribs or beads serve to maintain the upper walls of the rail 20 and slide 22 in transverse alignment with each other. It will be appreciated that the rollers 48 transmit the weight of the seat 10 and its occupants through the slide 22 to the rails 20 and while any suitable number of rollers 48 may be employed in conjunction with each rail 20 and slide 22 it will ordinarily be found that one roller 48 at each end of the slide 22, as indicated in the drawings, will be sufficient.

In order to maintain the ball bearings 42 and rollers 48 in properly spaced relation to each other longitudinally of the rail 20 and slide 22 a cage structure is provided for them. This cage is formed from a relatively thin sheet of metal to provide a vertical wall 54, best illustrated in Figs. 6 and 7, positioned between the lefthand walls of the rail 20 and slide 22. The wall 54 has joined to its lower end an angularly extending horizontal wall portion 56, extending to the right as viewed in Fig. 6 between the seam 32 of the rail 20 and the bottom wall of the slide 22. At the location of the ball bearings 42 the wall portion 56 is provided with an opening for receiving each of the balls 42 and the margins of such openings in embracing the balls 42 thus maintain them in properly spaced relation longitudinally of the cage. The wall portion 54 at its upper edge is joined to a horizontally extending wall portion 58, best illustrated in Fig. 4, which extends between the top walls of the rail 20 and slide 22 and its righthand edge, as viewed in Figs. 6 and 7, is downwardly flanged as at 60 to impart added rigidity thereto. The wall portion 58 lies in relatively closely but spaced relation with respect to the upper wall of the rail 20 and its central portion is longitudinally curved upwardly as best indicated in Figs. 4 and 6 at 62 to clear the bead or rib 46 of the rail 20.

As also best indicated in Figs. 4 and 6 the upper rail 58 of the cage in line with each of the rollers 42 is provided with an opening 64 therein for reception of the roller 48. The openings 64 are formed by shearing the metal along the sides and transversely across or adjacent the center of each opening and bending the two strips of metal thus formed within each opening upwardly at the outer sides of the strip 58 as indicated at 66 to form flanges, and short axle-like pins or projections 70 at opposite ends of each roller 48 are projected through suitable openings in the corresponding flanges 68, thereby maintaining the rollers 48 in fixed position longitudinally with respect to the cage.

As best indicated in Figs. 4 and 7 the central portion of the upper wall 58 of the cage is cut away as at 72 and this is for the purpose of providing clearance for the latching mechanism which will hereinafter be described. Also, and as best brought out in Fig. 3, the opposite end portions of the walls 54 and 56 of the cage are cut away as indicated at 74 in order to lighten the structure. The lower wall 56 may be additionally cut away if desired between the ball bearing 42, as indicated at 76 in Fig. 3, for the same purpose. From the foregoing it will be observed that the cage thus described cooperates with the ball bearings 42 and rollers 48 to maintain them in properly spaced relation with respect to each other longitudinally of the seat slide.

An important feature of the construition thus far described is as follows. The spacing of the ball bearing races 38 and 40 and the spacing between the upper walls of the rail 20 and slide 22 which receive the enlarged end portions of the rollers 48, when these parts are in their free and unstrained state, is less than that required to freely receive the ball bearings 42 and rollers 48 therebetween. In other words the proportions of these parts are preferably such that if the rail 20 and slide 22 were entirely rigid and inflexible it would be impossible to assemble the ball bearings 42 and rollers 48 between them as illustrated. Accordingly, the character of the metal from which either or both the rail 20 and slide 22 are formed, and the thickness of such metal is such that the walls of the rail and/or slide are yieldable or distortable under pressure and the balls 42 and rollers 48 are forced into position between them in assembly, and in being so forced into position slightly distort the walls of these parts. The amount which the walls of the rail and slide are thus distorted is preferably not sufficient to permanently distort such walls but merely to place them under stress whereby the balls and the rollers are resiliently gripped between their corresponding races. It has been found that if the balls 42 and rollers 48 are between 3/1000 and 8/1000 of an inch in diameter in excess of the normal free spacings of their respective races, the desired gripping effect of the balls and rollers will result. Thus placing the walls of the rail 20 and/or slide 22 under stress and the balls 42 and rollers 48 under compression between their respective races, positively insures against the development of any rattling or looseness between these parts in service and yet has substantially no effect in detracting from the free sliding characteristics of the seat 10 particularly when under load of an occupant. Additionally the interconnection of the rail 20 and slide 22 through the balls and rollers when under the stressed condition above described aids in reinforcing the rail and slide by one another.

It is also desirable in order to eliminate any possibility of the cage including the walls 54, 56 and 58 for the balls and rollers from possible rattling in service, to so arrange the openings in the cage for reception of the balls 42 and the axles 70 of the rollers 48 that the wall 54 in particular requires stressing or distortion during assembly and, of course, is maintained under stress after assembly. It will be appreciated that this will have the effect of preventing any possible looseness or vibration of the cage which would result in an audible sound to the occupants of the seat.

In order to enable the slide 22 to be latched in longitudinally adjustable position upon the rail 20 at frequent intervals over the range of its sliding movement, the upwardly projecting rib or bead 46 of the rail 20 is transversely interrupted, either over its entire length or simply over the the central portion thereof as indicated in the drawings, to provide a plurality of upstanding spaced teeth. This may be accomplished as best illustrated in Figs. 4 and 8 by simply providing depressions in the rib or web 46 at frequent intervals in the length thereof as indicated at 80 so that the rib or web between such depressions 80 serves in the nature of upstanding teeth. As indicated best in Fig. 4 in thus forming the depressions 80 to form the bead, or forming the bead or rib in short lengths to obtain the toothlike formation desired, the spaces 80 are preferably formed so as to present a wedge-like appearance in plan view as best brought out in Fig. 4.

As best brought out in Figs. 4, 7 and 8 the opposite side walls of the slide 22 intermediate the top wall thereof and top wall of the rail 20 are provided with openings therethrough in which a transversely slidable bar member 82 projects and is slidably received. As best brought out in Figs. 7 and 8 the bar member 82 is centrally depressed to provide a downwardly extending projection 84, which is wedge-shaped in plan view as indicated in Fig. 4 and arranged for selective complementary engagement between the opposite side walls of the depressions 80.

As best indicated in Fig. 7 the opening 86 in the righthand side wall of the slide 22 provided for reception of the bar member 82 is of sufficient depth over its central portion only to permit the projection 84 to be withdrawn therethrough, this being necessary both for the purpose of assembly of the bar member 82 and for the purpose of permitting the projection 84 to be withdrawn from inter-engaging relation with the depressions 80. The edge portions of the opening 86, however, are of substantially the same depth as the thickness of the bar member 82 so as to slidably receive the same and maintain it against vertical movement out of actual contact with the rail 20 except through the projection 84.

The end of the bar member 82 opposite the opening 86 is reduced in width and a coiled spring 88 is positioned about the reduced end beyond the slide 22 and is maintained under compression between the corresponding side face of the slide 22 and a cotter pin 90 projected therethrough as indicated. The spring 88 constantly urges the bar member 82 to the left as viewed in Fig. 7 so as to constantly urge the projection 84 thereof into one of the depressions 80, or stated differently, between two of the teeth formed in the bead or rib 46 by the depressions 80. It will be understood that when the projection 84 is thus disposed between any two of such teeth the slide 22 is positively locked against longitudinal movement with respect to the rail 20 and that upon withdrawing the bar member 82 against the force of the spring 88 sufficiently to withdraw the projection 84 from interengaging relation between the opposite walls of any of the depressions 80, the slide 22 is then released for longitudinal sliding movement with respect to the rail 20. The complementary wedge-shaped conformation of the depressions 80 and the projection 84 serves to firmly latch the rail and slide together when the latch is in operative position and so as to prevent any possible looseness between the slide and rail and any rattling of the bar member 82.

In order to actuate the bar member 82 to unlatch the slide 22 from the slide 20 the following mechanism is provided. A pair of angle brackets 92, best shown in Figs. 4 and 7, are fixed as by spot welding or the like to the outer or righthand face of the slide 22 as viewed in Fig. 7, with two of the legs thereof projecting perpendicularly with respect to such outer side face and in spaced and parallel relation with respect to each other and centrally disposed with respect to the center of the bar 82 in plan view. A bell crank 94 is received between the outstanding legs of the brackets 92 and is pivoted therebetween by means of a pin or rivet 96. The upwardly projecting short leg of the bell crank 94 is received within an opening 98 formed in the outer end of the bar member 82 and the free end of the remaining arm of the bell crank 94 has pivotally connected thereto the lower end of a rod 100. As best illustrated in Figs. 1 and 2 the rod 100 projects upwardly in slightly spaced relation with respect to the side of the seat 10 and its upper end is provided with an operating knob 102. The rod 100 may be guided in its vertical movement by means of a suitable guide block or bracket 104 suitably fixed to the seat frame 16 or at some other convenient location fixed with respect to the slide 22.

It will be understood that with the above described latch construction when it is desired to withdraw the latch bar 82 so as to release the slide 22 from the rail 20, all that is necessary is to press downwardly upon the knob 102 which, acting through the rod 100, will rotate the bell crank 94 in a clockwise direction, as viewed in Fig. 7, to withdraw the latch bar 82 against the force of the spring 88 and disengage the projection 84 from between the opposite walls of the particular depression 80 with which it has been engaged. After the slide 22 has thus been released from the rail 20 and has been moved longitudinally thereof to a desired position of adjustment, release of pressure on the operating knob 102 will permit the spring 88 to return the slide bar 82 and its projection 84 to the latching position previously described.

It will, of course, be understood that the lefthand support 14 as viewed in Fig. 1 may be constructed identically with the righthand supports thus far described and in which case the same latch bar 82, spring 88, and cotter pin 90 may be employed but that instead of providing the bell crank 94, the two latch bars 82 may be connected together by means of a rod 110 connecting the adjacent ends of the latch bars 82 so that the latch bars 82 will be operated by the knob 102 simultaneously with each other. In such case it will be preferably to provide a coil spring such as 112 illustrated in Fig. 7 about the down turned ends of the rod 110 which project through the latch bars 82 and are maintained under compression between the corresponding latch bars 82 and a cotter pin 114 projected through the end of the rod, thus insuring against the possibility of rattling of the rod 110. However, and particularly where the seat 10 is of a relatively great width, it will be appreciated that there may be a possibility of one slide 22 in one of the supports 14 moving longitudinally of its rail relative to the other slide 22 of the other supporting device 14 through slight yielding of the seat structure, under which circumstances a condition might arise in which the projection 84 for the lefthand side of the seat as viewed in Fig. 1 might not be aligned with one of the depressions 80 simultaneously with alignment of the righthand projection 84 with one of its corresponding depressions 80 and this might result in an undesirable condition in which both latches would not become fully engaged with their cooperating parts until the occurrence of some force causes the lefthand side of the seat, as viewed in Fig. 1, to shift longitudinally a sufficient distance to permit interengagement of the corresponding projection 84 with one of the corresponding depressions 80. To obviate this possibility resort may be had to the latch mechanism illustrated in Figs. 9, 10 and 11 either for the lefthand slide 14 only as viewed in Fig. 1, or for both of the devices 14 if desired. It is assumed for the purpose of illustration only in the present disclosure that the latch mechanism illustrated in Figs. 9, 10 and 11 are employed on the lefthand device 14 only, as viewed in Fig. 1, and that the latch mechanism heretofore described will be employed on the righthand supporting device 14 only.

Figures 9, 10, 11, 12:
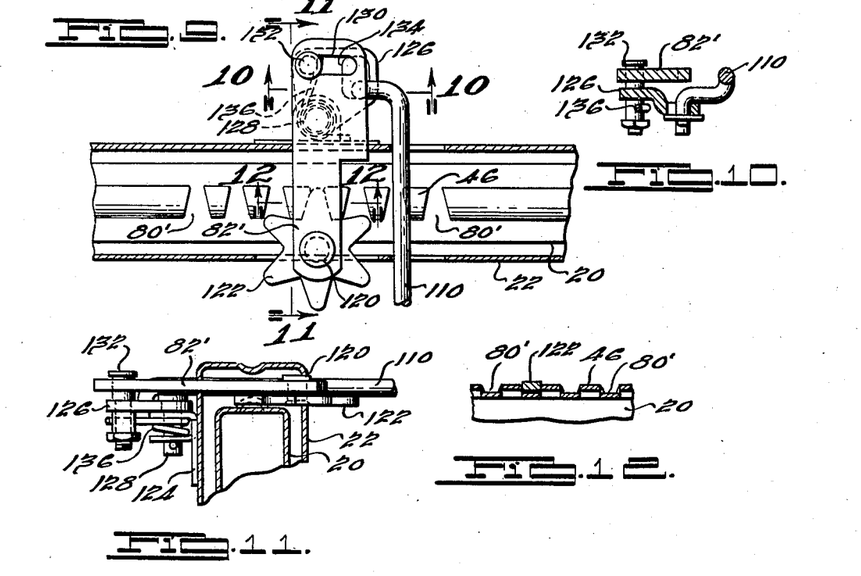
Fig. 9 is an enlarged, fragmentary, partially sectioned plan view similar to the view shown in Fig. 4, but illustrating the construction of the latching mechanism on the slidable support at the opposite side of the seat, namely the left-hand side of the seat as viewed in Fig. 1.
Fig. 10 is a vertical sectional view taken on the line 10—10 of Fig. 9.
Fig. 11 is a fragmentary vertical sectional view taken on the line 11—11 of Fig. 9.
Fig. 12 is a fragmentary vertical sectional view taken on the line 12—12 of Fig. 9.

Referring to Figs. 9, 10 and 11 it will be noted that the rail 20 and slide 22 are identical to the rail and slide already described except for the modified manner of providing the depression 80', corresponding to the depressions 80 previously described, in the ribs 46. In this case a bar member 82', corresponding to the bar member 82 previously described, projects through opposite side walls of the slide 22 between the top walls of the rail 20 and slide 22 and is supported thereby for longitudinal slidable movement. Instead of being provided with a projection such as the projection 84 previously described, the bar member 82' in this case has rotatably mounted against its lower face, by means of a pin or rivet 120, a star wheel 122, the various teeth of the star wheel 122 being shaped for complementary engagement between the side walls of the depressions 80'. Because of the fact that the side walls of the depressions 80' are straight, although tapered, and the sides of the teeth of the star wheel 122 are correspondingly straight and tapered, when one of the teeth of the star wheel 122 is in full engagement with the side walls of one of the depressions 80' the star wheel 122 is positively locked against rotation and consequently being attached to the latch bar 82', serves to positively lock the corresponding slide 22 to the corresponding rail 20. It will be appreciated, however, that if the latch bar 82' is partially withdrawn or retracted so as to partially withdraw the engaged tooth of the star wheel 122 from between the opposite walls of an engaged depression 80', sufficient clearance will be permitted to permit rotation of the star wheel 122 upon relative sliding movement between the corresponding rail 20 and slide 22, the star wheel thus cooperating with the co-acting portion of the rib or bead 46 in a manner similar to a gear with a rack. The amount which the star wheel 122 must thus be moved bodily away from the fully engaged position illustrated in Fig. 9 to permit its rotation and consequently to unlatch the corresponding rail 20 and slide 22 is but a fraction of the movement required of the previously described latch bar 82 to release its corresponding depression 84 from the cooperating walls of the depressions 80.

In order to effect simultaneous reciprocation of the latch bars 82 and 82' and yet move the latch bar 82' only a portion of the distance required to move the latch bar 82, the following mechanism is provided. To the lefthand side of the slide 22 as viewed in Fig. 11, an angle bracket 124 is fixed as by welding or the like with one leg thereof disposed in a horizontal plane and projecting outwardly or to the left from such side wall of the slide 22. A plate-like lever or cam plate 126 is pivotally mounted upon the bracket 124 by means of a rivet 128. The outer or lefthand end of the latch bar 82' as viewed in Fig. 11, or the upper end thereof as viewed in Fig. 9, is provided with a transversely extending slot 130 therethrough through which projects a pin 132 and which pin is fixed to the cam plate 126. The upper righthand portion of the cam plate 126 as viewed in Fig. 9 is provided with a relatively large opening 134 therein in which the forwardly and downwardly bent end of the rod 110 is loosely received. A torsion spring 136 encircling the pin 128 and bearing against the bracket 124 and the pin 132 at its opposite ends, constantly urges the cam plate 126 in a counterclockwise direction of movement as viewed in Fig. 9, thus urging the pin 132 to the lefthand side of the slot 130 and tending to pull the latch bar 82' inwardly or upwardly as viewed in Fig. 9, to the full extent of its movement so as to interengage a tooth of the star wheel 122 with the opposite walls of one of the depressions 80'. When in this position the center of the pin 132 passes to the left, as viewed in Fig. 9, of a plane including the axes of the pin 120 for the star wheel 122 and the pin 128 for the cam plate 126, thus providing a toggle-like action of the cam plate 126 and latch bar 82' tending to hold the star wheel 122 in engagement with the cooperating walls of the depressions 80' and positively preventing any force acting longitudinally of the slide 22 from releasing the fully latched relation of the star wheel. When, however, the control knob 102 is pushed downward by the occupant in the seat 10 in order to release the latched position of the seat for slidably adjustable movement on the rail 20, the corresponding inward movement of the latch bar 82 acting through the rod 110 pulls the rod 110 downwardly as viewed in Fig. 9 and in so doing rotates the cam plate 126 about the pin 128. This rotation of the cam plate 126 carries the pin 132 in a circular path about the center of the pin 128 and in bearing against the side wall of the slot 130 serves to cam the latch bar 82' downwardly. It will be appreciated that because of the geometry of the parts as indicated the rod 110 will move longitudinally through a considerably greater extent of movement than will the pin 132 longitudinally of the latch bar 82', the proportional amounts of movement in this respect being such that when the latch bar 82 has moved sufficiently to withdraw the projection 84 from between the walls of a cooperating depression 80, the latch bar 82' will have moved longitudinally thereof sufficiently to release the then engaged tooth of the star wheel 122 from between the cooperating walls of the then engaged depression 80' to permit rotation of the star wheel 122, and consequently both of the slides 22 will be released for sliding movement upon their corresponding rails 20.

Referring now particularly to Fig. 12 it will be observed that the depressions 80' formed in the rib or bead 46 in this case, instead of being formed by a pressing operation as in the previously described construction, in this case are formed by shearing the walls of the rib or bead 46 transversely at intervals in its length and depressing alternate strips of the metal thus sheared downwardly to form the depressions 80'. Either one of the methods disclosed for forming these depressions in the ribs 46 is satisfactory for use and the ultimate result is the same in any case.

Figures 13, 14:
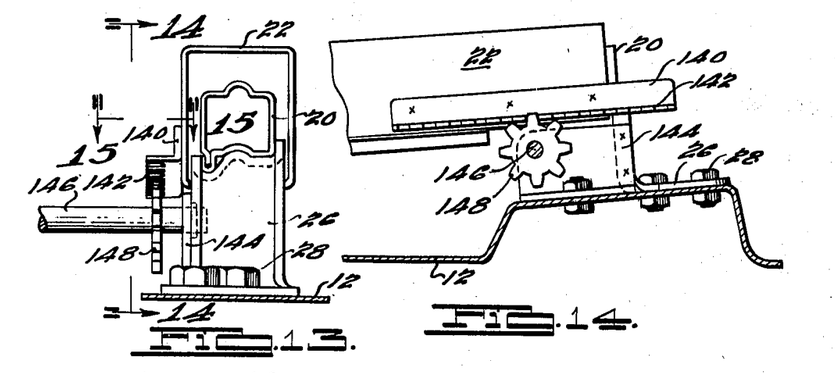
Fig. 13 is a front elevational view of the righthand slidable seat support showing the adaptation of means for gearing the two seat slides together for equal and simultaneous movement.
Fig. 14 is a fragmentary side elevational view of the structure shown in Fig. 13 and taken as on the line 14—14 thereof.
Figure 15:
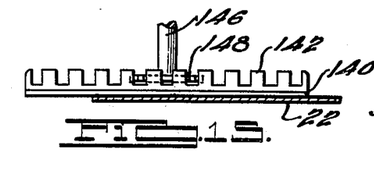
Fig. 15 is a fragmentary plan view taken on the line 15—15 of Fig. 13.

Instead of using a separate latching means on each of the supporting devices 14 as above described, it may be desirable in some instances to positively interconnect the two slides 22 for equal sliding movement and in such case a latching mechanism which, for instance may be either of the two types above described, need be employed on one of the supporting devices 14 only. Figs. 13, 14 and 15 illustrate one means by which the slides 22 of both of the supporting devices 14 may be thus positively interconnected for equal sliding movement. The construction shown in these figures is identical to that previously described except for the means interconnecting the two slides and, accordingly, this additional mechanism need be described only in order to effect a complete understanding of the entire structure. As illustrated in Figs. 13, 14 and 15 the inner or opposed walls of each of the slides 22 is provided with an angle member 140 fixed thereto as by welding or the like with one flange thereof extending inwardly or towards the opposite slide 22 and parallel to the direction of movement of the slide 22. The inner edge of the angle member 140 is slotted at equal intervals over its length so as to form such edge into a gear rack 142.

A short plate 144 is fixed at its forward edge as by welding or the like to the inner side edge of the forward Z-shaped supporting member 26 of each of the supporting devices 14 and extending and rotatably supported between the upper rear portions of each of the plates 144 on the opposite supports 14 is a shaft 146. The shaft 146 adjacent each end thereof and in vertical alignment with the corresponding rack 142 has fixed thereto a gear 148 lying in mesh with the corresponding rack. It will be appreciated that with this construction any movement of one of the slides 22 will act through its corresponding rack 142 and gear 148 to rotate the shaft 146 and that such rotational movement of the shaft 146 will cause an equal and positive movement of the opposite slides 22. Accordingly, by means of this construction when one of the slides 22 only is latched against relative movement the opposite slide 22 is equally and correspondingly locked against movement.

Figure 16:
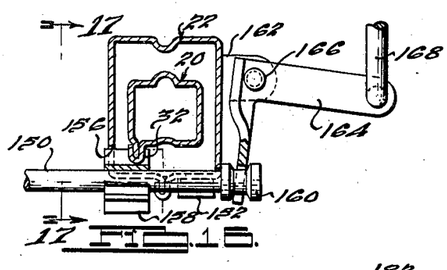
Fig. 16 is a vertical sectional view taken through a seat slide structure of the general type shown in the previous views but illustrating the adaptation of a modified form of means for gearing the two opposite slides together as well as for releasably latching the opposite slides against slidable movement.
Figure 17:
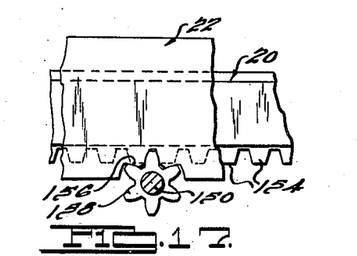
Fig. 17 is a fragmentary side elevational view taken on the line 17—17 of Fig. 16.

The type of construction illustrated in Figs. 13, 14 and 15 may be carried still further and made to serve itself as a latching mechanism by modifying it in the manner illustrated in Figs. 16 and 17. In this case a shaft 150 is extended between the slides 22 of the opposite supporting devices 14, the shaft 150 projecting through the lower portion of each slide 22 and the lower walls of the slides 22 each having a downwardly extending semi-cylindrical portion 152 struck therefrom serving to rotatably receive the corresponding end of the shaft 150 therein. The flange-like seam 32 of each of the rails 20, as best illustrated in Fig. 17, is in this case, over at least a portion of the length thereof, formed to provide a plurality of rack teeth 154. The lower portion of the inner wall of the righthand slide 22 and the outer wall of the lefthand slide 22, as viewed in Fig. 1, are each formed as indicated in Fig. 17 to form a partial internal gear-like aperture or opening 156. A gear 158 is secured to the shaft 150 in line with and in meshing engagement with the teeth of each rack 154, and when each gear 158 is in axially overlapping relation with respect to the corresponding side wall of the slide 22 in which the corresponding opening 156 is formed, it is interlocked with the walls of the opening 156. The proportions of the gears 158 with respect to the walls of the openings 156 are such as to positively lock the gears 158 against rotation when engaged therewith and consequently when in the position illustrated in Figs. 16 and 17 the gear 158 of each of the supporting devices 14 positively interlocks the corresponding rail 20 and slide 22 against relative sliding movement. The shaft 150 is axially movable so as to enable the gears 158 to be withdrawn axially from engagement with the walls of the corresponding openings 156 in which case the gears 158 lie in meshing relationship with the racks 154 only and under such circumstances the slides 122 may slide relative to the rails 20 but, being positively geared to the respective rails 20, both slides 22 are caused to slide equally and in unison with each other. When a desired position of slidably adjustable movement is thus reached upon withdrawal of the gears 158 from the openings 156, axial reciprocation of the shaft 150 to again bring the gears 158 into engagement with the walls of the openings 156 will again serve to positively latch the slides 22 against movement in their respective rails 20.

Any conventional form of spring means, not shown, may be conventionally arranged to constantly urge the shaft 150 axially towards latching position as will be readily appreciated. In order to permit the shaft 150 to be moved axially to release the gears 158 from the corresponding openings 156 in the slides 22, the following mechanism is provided. One end of the shaft 150 may be allowed to project beyond that side of the corresponding slide 22 opposite the corresponding gear 158 and be provided with a spool-like member 160 fixed thereto. A bracket 162 may be fixed to the corresponding slide 22 above the spool 160 and pivotally support a bell crank 164 by means of a rivet or pin 166. The extremity of one arm of the bell crank 164 may be twisted into a plane perpendicular to the axis of the shaft 150 and bifurcated so as to be received over and between the opposite ends of the spool 160 and thereby be constrained to equal movement axially of the shaft 150 therewith. A control rod 168, corresponding to the control rod 100 previously described, may be pivotally connected to the free end of the remaining arm of the bell crank 164 to enable actuation thereof.

In Figs. 18 to 26, inclusive, modified forms of construction for the rail and slide of the heretofore described construction are illustrated and it will be understood that these modified forms of structures may be substituted for those previously described in substantially all instances to obtain the desired effect. It will also be understood without again specifically mentioning it in each case that the various modified forms of construction illustrated are preferably so constructed, proportioned and arranged as to place either the rail member or the slide member or both thereof under stress when assemblying one to the other to thus obtain the beneficial effects of this feature described in connection with the above described structures.

Figures 18, 19, 20, 21, 22, 23, 24, 25, 26:
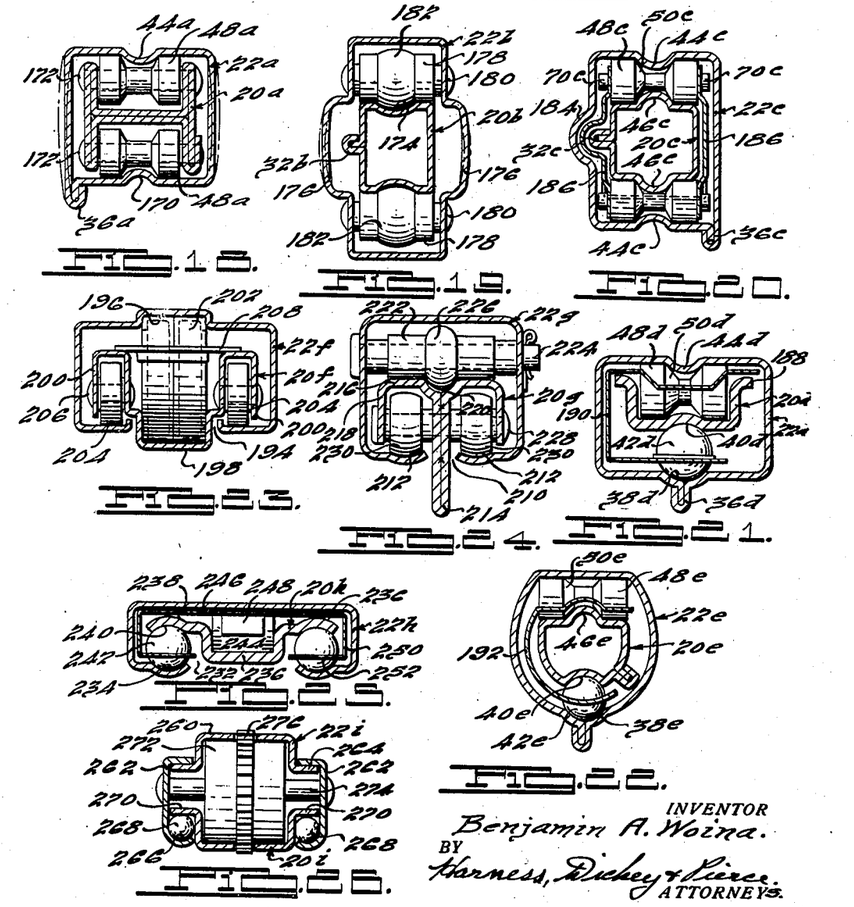
Figs. 18 to 26, inclusive, are vertical sectional views taken transversely through modified forms of slide and rail structures applicable for use in slidable seat structures of the type shown in the previous views.

Referring now to Fig. 18, it will be noted that the slide 22a thereof similar in cross-sectional configuration to the slide 22 previously described except that in this case the seam 36a thereof is located at one of the lower corners instead of in the center, and instead of providing a central groove forming a raceway in the lower wall thereof, the lower wall is formed to provide an upwardly extending longitudinal bead or rib 170. The upper wall of the slide 22a is formed with a downwardly extending rib or bead 44a the same as in the first described construction. The rail 20a in this case instead of being formed as a tubular member as in the first described construction, is formed from sheet metal into an H-shaped structure having double thickness walls. In other words it is formed from sheet metal into a more or less I-beam section with the web of the beam disposed horizontally and the channels formed at the opposite sides of the same disposed upwardly and downwardly, respectively. In this case the rollers 48a corresponding to the rollers 48 previously described are provided both at the upper and lower sides of the rails 20a within the channels thereof and cooperate with the opposed horizontal walls of the slide 22a in substantially the same manner as in the first described construction. However, in this case the rollers 48a are rotatably mounted upon pins 172 which bridge the opposite flanges of the I-beam sectioned rail 20a on the corresponding side of the web thereof and are maintained out of contact with the web portion of the rail. No cage is necessary in this construction inasmuch as the pins 172 serve to maintain the rollers 48a in fixed relation to the rail 20a longitudinally thereof. The lower rollers 48a in this case, of course, serve the same purpose as the ball bearings 42 in the previously described construction.

In the construction illustrated in Fig. 19 both the rail 20b and slide 22b are of tubular formation and preferably formed from sheet metal to the cross-sectional configuration shown. The rail 20b in this case is provided with a seam 32b centrally of one of its side walls. In this case the upper and lower horizontal walls of the rail 20b are each provided with a longitudinally extending inwardly projecting groove or trough 174. The slide 22b in this case is provided centrally of each side wall thereof with an outwardly projecting portion 176 extending outwardly beyond the plane of the remainder of such side walls, this being for the purpose of providing ample clearance for the rail 20b as well as to provide a side wall section that will be more readily yieldable during assembly of the rail and slide to accommodate the rolling anti-friction elements and which places such side walls under tension after assembly in a manner similar to the construction first described. In this case rollers 178 are employed and these are rotatably mounted upon pins 180 extending between the opposite side walls of the slide 22 above and below the outwardly projecting portions 176, the rollers riding upon the adjacent faces of the rail 20b. The rollers 178 are each centrally provided with an annular enlargement 182 which enlargements are received in the corresponding grooves or troughs 174 of the rail 20b thereby to maintain the slide and rail against lateral displacement with respect to each other. It is not necessary that the annular enlargements 182 bear against the surfaces of the grooves 174 over the full width thereof as the desired effect may be obtained by bearing against the marginal edges only thereof as indicated.

In the construction illustrated in Fig. 20 both the rail 20c and slide 22c are of tubular construction and formed from sheet metal. The seam 32c of the rail 20c is disposed centrally of one of the side faces thereof and the seam 36c of the slide 22c is disposed at one of the lower edges thereof. One side wall of the slide 22c is outwardly curved as at 184 centrally of one of its side walls so as to provide suitable clearance for the sliding movement of the seam 32c therethrough. In this case the rail 20c is provided centrally of its upper and lower walls with a longitudinally extending outwardly projecting bead or rib 46c and the upper and lower walls of the slide 22c are each centrally provided with an inwardly projecting and longitudinally extending rib or bead 44c in opposed relation to the adjacent ribs or beads 46c. Rollers 48c corresponding to the rollers 48 previously described are disposed between the upper walls and lower walls, respectively, of the rail 20c and slide 22c, the cut away portions 50c at the centers of the rollers 48c providing for reception of the ribs or beads 44c and 46c, respectively, so as to maintain the slide and the rail against lateral displacement with respect to each other. The rollers 48c bear directly against the adjacent walls of the rail and the slide and roll with respect to both of these walls so that in this construction a cage is preferable for maintaining the relative positions of the rollers. The cage in this case is formed by means of plates 186 disposed between the adjacent side walls of the rail and the slide and extending between the upper and lower rollers 48c. The upper and lower margins of the plates 186 are provided with openings for receiving the axle portions 70c of the rollers 48c. It will be appreciated that the plates 186 preferably require springing in assembling the rollers 48c between the rail and slide to obviate the possibility of rattling of these parts in a manner similar to that described in connection with the first described cage structure.

In Fig. 21 the slide 22d is of tubular construction and formed similarly to the slide 22 first described in that its upper wall is provided with an inwardly extending bead or rib 44d and the seam 36d is formed centrally of the lower wall, and the opposite margins of the metal of the blank from which the slide is formed immediately above the seam 36d is formed to provide an upwardly opening trough 38d forming a raceway for ball bearings 42d. The rail 20d is not of tubular construction in this case. Instead it is formed as an upwardly opening channel the upper marginal edges of which are preferably out-turned as at 188 to impart added rigidity thereto. The lower wall of the rail 20d is formed centrally thereof to provide a longitudinally extending downwardly opening groove or trough 40d forming a raceway opposed to the raceway 38d for reception of the ball bearings 42d. A roller 48d corresponding to the roller 48 previously described is positioned in the channel of the rail 20d and bears against the bottom wall thereof as well as against the top wall of the slide 22d. It will be noted that the formation of the ball race 40d in the rail 20d forms a complementary rib or bead projecting upwardly from the lower wall of the rail 20d centrally thereof in opposed relation to the rib or bead 44d and is received in the cut away central portion 50d of the roller 48d. The balls 42d and rollers 48d thus cooperate with the rail and slide to prevent lateral displacement of one with respect to the other in the same manner as in the previously described constructions. It will also be noted that, in this case a cage member 190 extending around three sides of the rail 20d is arranged in embracing relationship with respect to the balls 42d and rollers 48d to maintain them in their desired longitudinally spaced relation.

In Fig. 22 both the rail 20e and the slide 22e are of tubular construction. In cross-sectional configuration both the rail and the slide are of substantially circular cross-sectional configuration except that the upper portions thereof are flatted off to provide horizontally extending and opposed wall sections. Additionally, this upper wall of the rail 20e is formed to provide a longitudinally extending upwardly projecting and centrally disposed rib or bead 46e and its lowermost portion is formed to provide a downwardly opening trough forming a ball race 40e. The lower extremity of the slide 22e is formed to provide an upwardly opening trough or ball race 38e opposed to the race 40e and between which ball bearings 42e are received. Rollers 48e, similar to the rollers 48 previously described, are received between the upper horizontal wall portions of the rail and slide and have rolling engagement with both thereof, the rib or bead 46e being received within the cut away portion 50e of the rollers and thus locating the rollers 48e laterally with respect thereto. The outer marginal edges of the rollers 48e substantially abut against the side walls of the slide at each end of the upper horizontally extending surface thereof so as to maintain the rollers 48e against axial movement laterally of the slide 22. The ball bearings 42e and rollers 48e consequently maintain the lateral positions of the rail and slide in this construction in a manner similar to that obtained in the previously described construction. A cage member 192 disposed between the rail 20e and slide 22e cooperates with the ball bearings 42e and rollers 48e to maintain the relative longitudinal positions of these members in a manner similar to the cages previously described.

In Fig. 23 the slide 22f is not completely tubular in cross-sectional configuration, it being provided in its lower wall with a central slot 194 preferably extending the full length thereof. The upper wall of the slide 22f is provided centrally thereof with an upwardly offset portion forming on its inner surface a downwardly opening trough or groove 196 having a flat bottom wall. The rail indicated generally at 20f in this figure is formed from sheet metal to provide first an upwardly opening channel portion 198 bounded at each side thereof by a downwardly opening channel portion 200 extending the full length thereof. The width of the bottom portion of the channel 198 of the rail 20f is the same as the channel 196 and receives therebetween in rolling contact with the bottom wall of both thereof a plurality of rollers 202, the rollers 202 being of substantially the width as the channels 196 and 198 at their point of contact therewith so as to maintain the rail and slide against relative lateral displacement. Between the opposite walls of each of the channels 200 a plurality of rollers 204 are rotatably mounted by means of pins 206, the rollers 204 bearing against the inner faces of the corresponding inwardly projecting bottom wall portions of the slide 22f. It will be appreciated that in the construction illustrated in Fig. 23 the rollers 202 serve to transmit the weight of the seat from the slide to the rail and the rollers 204 serve to maintain the slide against upward movement with respect to the rail 20f as well as to cooperate therewith to maintain the slide and/or the rail in stressed condition during assembly. The rollers 204 being fixed longitudinally of the rail by means of the axles or rivets 206 require no cage to maintain the longitudinal position thereof. The longitudinal spacing of the rollers 202 may be maintained by means of a cage member consisting of a substantially flat plate 208 disposed between the upper walls of the rail and the slide and provided with suitable apertures therein for reception of the various rollers 202. It might be noted that in the particular construction illustrated in Fig. 23 each roller 202 is illustrated as being made up of two relatively short rollers suitably formed from sheet metal having their axially abutting faces fixed together as by welding or the like.

In the construction illustrated in Fig. 24 the slide 22g is similar to the slide 22f in Fig. 23 in that its lower wall is not continuous but is longitudinally and centrally slotted as at 210 and its lower wall on each side of such slot is formed to present an upwardly opening raceway 212. The rail which is indicated generally at 20g in this figure is formed from sheet metal into generally T-section, that is to say, to provide a central leg 214 of double thickness and opposite outwardly extending head portions 216 each of which terminates at its outer edge in a downwardly extending flange 218 forming between it and the leg 214 a downwardly opening channel. The inner marginal portions of the head portions 216 are formed to provide an upwardly opening trough or groove 220 extending longitudinally of the rail centrally of the leg 214. Rollers 222 rotatably mounted upon pins or axles 224 extending between the opposite side walls of the slide 22g above the rail 20g bear against the upper surfaces of the head portion 216 of the rail and each is provided with a central annular enlarged portion 226 which is received within the trough or groove 220 to aid in maintaining the rail and slide against lateral displacement with respect to each other. Additional pins or axles 228 are extended between the downwardly turned marginal side portions 218 or the rail 20g and through the leg 214 thereof and within the channel formed between each of the portions 218 and the leg 214 rotatably receive thereon rollers 230 bearing in the corresponding race 212 of the slide. All of the rollers in this construction being mounted on pins or axles, no cage member is required to maintain the proper longitudinal spacing thereon.

In Fig. 25 a construction is shown in which certain features of the construction shown in Fig. 21 and those shown in Figs. 23 and 24 are combined. In other words in Fig. 25 the slide 22h is provided with a slot 232 centrally of the lower wall thereof and the lower wall portions at each side of the slot 32 are formed to provide upwardly opening troughs or ball races 234. The rail 20h is in this case formed to provide a central upwardly opening channel 236 the upper side marginal portions of which are outwardly turned as at 238 and each of which is formed to provide a downwardly opening trough or ball race 240 opposed to the corresponding ball race 234 of the slide and between which opposed ball races a plurality of ball bearings 242 are received. A roller 244 of substantially the same width as the channel 236 is received therein and bears against both the lower wall of the channel 236 and the upper wall of the slide 22h, the assembly of the balls 242 and rollers 244 maintaining the slide and/or rail under tension during assembly as in the constructions previously described. A cage member 246 in this case extends between the upper portion of the rail 20h and the upper wall of the slide 22h and is centrally provided with suitable openings for reception of the various rollers 244, and at each side of the opening is provided with a downwardly struck tongue portion 248 adapted to bear against the sides of the rollers. The side portions of the cage 246 extend downwardly as at 250 and then inwardly as at 252 and such inwardly extending portions are provided with suitable apertures for reception of the ball bearings 242.

In the construction illustrated in Fig. 26 the slide which is indicated generally at 22i is formed in three parts, namely a downwardly opening channel sectioned part 260 and a pair of oppositely inwardly opening channel portions 262. The lower marginal edges of the portion 260 are outwardly turned as at 264 and are received within the corresponding side channel members 262 and in contact with a side wall thereof. The lower walls of the side channel members 262 are each formed to provide an upwardly opening ball race 266 therein in each of which a plurality of ball bearings 268 are received. The rail indicated generally at 20i in this case is of generally channel sectioned conformation having the upper marginal portions thereof outwardly bent as indicated at 270. The portions 270 overlie the ball bearings 268 and bear thereagainst. A plurality of rollers 272 are received between and bear against the bottom walls of the channel 260 of the slide 22i and the channel of the rail 20i, the relation of the parts being such, as in the previously described construction, as to maintain the walls of the slide and/or the rail under stress during and after assembly. Particularly where the side portions 262 of the slide are not fixed as by welding or the like to the central portion 260 thereof, the assembled relation of these parts may be maintained by the provision of transversely extending pins or rivets 274 extending between the opposite members 262 at intervals over the length of the slide intermediate the rollers 272 and headed over outwardly of the members 262 to prevent lateral spreading thereof. Under some circumstances it may also be desirable to provide against relative slippage of rollers 272 with respect to the rail and slide in the construction illustrated in Fig. 26 and in such case the rollers 272 may each be centrally provided with an annular radially projecting spur gear 276 thereon, the cooperating upper wall of the slide 22i and lower wall of the rail 20i being formed to provide gear racks for engagement with the gears 276.

Formal changes may be made in the specific embodiments of the invention described without departing from the spirit or substance of the broad invention, the scope of which is commensurate with the appended claims.

What I claim is:

1. In a seat slide structure, in combination, a rail, a slide substantially encompassing said rail, anti-friction elements disposed both above and below said rail spacing said rail and slide, and means for supporting said rail from a floor including a member fixed externally to one end thereof and receivable at least in part within the space provided by said anti-friction elements between said rail and slide when said slide is at one limit of its movement relative to said rail.

2. In a seat slide structure comprising, in combination, a tubular rail, a tubular slide telescopically receiving said rail, rolling anti-friction means interposed between the said rail and slide and serving to maintain said rail in spaced relation with respect to said slide, and supporting means for said rail including an upwardly extending leg having a horizontally extending portion extending in contact with and fixed externally to an end of said rail, the lower walls of the rail and slide being so constructed and vertically spaced as to enable said horizontally extending portion of said leg to be received therebetween.

3. In a slidable seat supporting structure, in combination, a tubular rail, a tubular slide arranged in telescoping relation with respect to said rail, rolling anti-friction elements interposed between said rail and slide and maintaining them in spaced relation with respect to each other, and leg means secured to said rail at one end thereof for supporting said end, an end on said leg means extending longitudinally of said rail and fixed to an external surface thereof, said end being of less thickness than the diameter of said rolling anti-friction elements whereby to enable it to be received between said rail and slide, and at least one end of said slide having the lower wall thereof cut away to permit the passage of said leg therethrough.

4. In a sliding seat structure, in combination, a rail, a slide receiving said rail therein, the upper wall of said slide being centrally provided with a downwardly projecting longitudinally extending bead or rib thereon, the upper wall of said rail being centrally provided with an upwardly projecting longitudinally extending bead or rib thereon opposed to the first mentioned rib, a roller interposed between the upper wall of said slide and said rail bearing against said upper wall and said rail and having a centrally relieved portion for reception of said ribs, and rolling anti-friction means interposed between the lower wall of said slide and said rail for maintaining said lower wall in spaced relation with respect to said rail.

5. In a seat slide structure, in combination, a rail, a hollow slide receiving said rail therein and extending into at least partially embracing relationship with respect to the top, bottom and sides thereof; a downwardly extending rib formed centrally of the upper wall of said slide and an upwardly projecting rib formed centrally of the upper surface of said rail, a roller interposed between the upper walls of said rail and slide and having an annular groove between the ends thereof receiving said ribs, the walls of said groove cooperating with said ribs to maintain said rail and slide against such lateral movement with respect to each other as to permit the sides thereof to contact one another.

6. In a seat slide structure, in combination, a rail, a slide receiving said rail therein, a downwardly extending rib formed centrally of the upper wall of said slide and an upwardly projecting rib formed centrally of the upper wall of said rail, a roller interposed between the upper walls of said rail and slide and being centrally relieved for reception of said ribs therein, opposed races formed in the opposed lower walls of said rail and slide, and balls received between said opposed races.

7. In a slidable seat support, in combination, a rail provided centrally thereof with an upwardly projecting longitudinally extending rib formed integrally therewith and a track on each side of said rib, a slide embracing said rail, rollers interposed between the upper wall of said slide and said tracks of said rail and being centrally relieved for reception of said rib therein to maintain said roller against lateral displacement with respect to said rail, said rollers adapted to roll on said tracks during relative longitudinal movement between said rail and slide, said rib being interrupted at intervals over at least a portion of its length to form upstanding teeth on said rail, and a latch element for releasably latching said slide to said rail including a member carried by said slide and releasably engageable with said teeth for locking said slide against relative longitudinal movement with respect to said rail.

8. In a slidable seat support, in combination, a rail provided centrally thereof with an upwardly projecting longitudinally extending rib formed integrally therewith and a track on each side of said rib, a slide embracing said rail, rollers interposed between the upper wall of said slide and said tracks of said rail and being centrally relieved for reception of said rib therein to maintain said roller against lateral displacement with respect to said rail, said rollers adapted to roll on said tracks during relative longitudinal movement between said rail and slide, said rib being interrupted at intervals over at least a portion of its length to form upstanding teeth on said rail, and a latch element for releasably latching said slide to said rail including a member carried by said slide and releasably engageable with said teeth for locking said slide against relative longitudinal movement with respect to said rail, said element comprising a star wheel so constructed and arranged as to be positively locked against relative rotation with respect to said rail when a tooth thereof is fully engaged between said teeth on said rail and being rotatable with respect to said rail when the teeth thereof are in partially disengaged relation with respect to said teeth on said rail.

9. In a seat slide structure, in combination, a rail having a longitudinally extending rib projecting upwardly therefrom and interrupted at intervals to form teeth, a slide supported on said rail, rolling anti-friction elements interposed between said slide and rail arranged to roll on both thereof and maintaining the cooperating surfaces thereof in spaced relation, said elements being centrally relieved to receive said rib therein thereby to maintain the position of said elements laterally of said rail, a plate-like latching member carried by said slide and disposed vertically between said spaced surfaces thereof and longitudinally between a pair of said rolling anti-friction elements, a projection formed integrally with said latching element depending therefrom and movable therewith from a position between a pair of said teeth to a position free of engaging relation with respect to said teeth, and means for operating said latching element.

10. In a seat slide structure, in combination, a rail formed from sheet metal to provide a substantially flat upper surface having an integral upstanding longitudinally directed bead thereon, a slide supported on said rail for movement longitudinally thereof, said rib over at least a portion of the length thereof being depressed at intervals to provide teeth, and a latching element carried by said slide and movable in a direction transversely of the length thereof releasably engageable between a pair of said teeth.

11. In a seat slide structure, in combination, a rail formed from sheet metal to provide a substantially flat upper surface having an integral upstanding longitudinally directed bead thereon, a slide supported on said rail for movement longitudinally thereof, the metal of said rib being transversely sheared at intervals over at least a portion of the length thereof and the alternate strips between the line of shearing being depressed to provide a plurality of upstanding teeth, and a latching element carried by said slide and movable in a direction transversely of the length thereof releasably engageable between a pair of said teeth.

12. A seat slide structure comprising, in combination, a slide having upper and lower surfaces, a downwardly extending rib extending longitudinally of said upper surface, the lower wall of said slide being provided with an upwardly opening groove therein extending longitudinally thereof, a rail interposed between said upper and lower surfaces, an upwardly extending rib on said rail extending longitudinally thereof and said rail having a downwardly opening groove therein, balls interposed between said grooves, and rollers interposed between said rail and the upper surface of said slide, said rollers being centrally relieved for reception of said ribs therein.

13. In a seat slide construction of the class wherein a pair of elongated members are disposed in telescopic relationship with respect to each other and are mounted for relative longitudinal movement with respect to each other, in which one of said members is formed with a trackway having a central, longitudinally extending rib, and in which rollers engage said members in the space therebetween and runs along said trackway in engagement with said rib, the combination with said members of means to lock said members against movement with respect to each other, said means including a latch element mounted on the other of said members and movable transversely of said rib into and out of locking engagement with said rib, to thereby apply the locking force centrally of said trackway so that said trackway is not distorted by said force.

14. In a seat slide construction of the class wherein a pair of elongated members are disposed in telescopic relationship with respect to each other and are mounted for relative longitudinal movement with respect to each other and wherein one of said members is formed with a trackway, the combination with said members of a rib formed integrally with said trackway, and positioned centrally thereof, centrally relieved rollers adapted to roll along said trackway in engagement with said rib to thereby prevent lateral movement and locking means associated with said members and said rib for releasable locking engagement with said rib so that the locking force is applied centrally of said trackway to thereby prevent the locking force from distorting the trackway and to thereby insure proper operation of said rollers on said trackway.

15. In a seat slide structure, a pair of elongated members disposed in telescopic relation with respect to each other and mounted for longitudinal movement with respect to each other, one of said members being formed to provide a trackway, a longitudinally extending rib integral with said trackway and positioned centrally thereof, a roller disposed between and engaging said members and adapted to run along said trackway in engagement with said rib, and means to lock said members against movement with respect to each other, said means including a latch element mounted on the other of said members and movable transversely of said rib into and out of locking engagement with said rib, to thereby apply the locking force centrally of said trackway thereby insuring that said trackway is not distorted by said force.

16. In a seat slide structure, in combination, a slide having integrally connected upper and lower walls, a rail telescopically received between said walls and adapted for longitudinal movement relative thereto, one of said walls and the adjacent surface of said rail being shaped to provide co-operating substantially flat trackways, the other of said walls and the rail surface adjacent thereto provide co-operating raceways, rollers adapted to roll simultaneously on said co-operating trackways and balls adapted to roll simultaneously on said raceways, each of said rollers and said balls being of a diameter slightly greater than the normal distance between their respective walls and adjacent rail surfaces prior to the forcing of said rollers and said balls therebetween to thereby prevent other than longitudinal movement of said rail relative to said slide, said rollers having an extended line contact with said rail and said slide, through which the entire weight carried by said slide is transmitted to said rail.

17. In a seat slide structure, in combination, a rail member and a slide member, one arranged for sliding movement longitudinally of the other, a plurality of teeth fixed with respect to one of said members, a bar member carried by the other of said members for sliding movement with respect thereto in a direction transverse to the length of said other member, a pin carried by said bar member, a latch element revolvably mounted on said pin, said latch element and said teeth being so constructed and arranged that full engagement of said latch element between a pair of said teeth locks said latch element against movement about the axis of said pin and permits rotation of said latch element about the axis of said pin when said latch element is only partially engaged between a pair of said teeth, spring means constantly urging said bar member in a direction of slidable movement tending to fully seat said latch element between a pair of said teeth, and manually operable means for moving said bar member against the force of said spring means.

18. In a seat slide structure, in combination, a rail member and a slide member, one arranged for sliding movement longitudinally of the other, a plurality of teeth fixed with respect to one of said members, a bar member carried by the other of said members for sliding movement with respect thereto in a direction transverse to the length of said other member, a star wheel rotatably mounted on said bar and movable bodily therewith, said star wheel being movable with said bar member to engage a tooth thereof between an adjacent pair of said teeth on said one of said members, the teeth of said one of said members and teeth of said star wheel being so constructed and arranged that when a tooth of said star wheel is fully engaged between an adjacent pair of teeth of said one of said members said star wheel is locked against rotation on said bar member and when partially disengaged said star wheel is free to rotate on said bar member, spring means constantly acting to urge said bar member in a direction to fully engage a tooth of said star wheel between an adjacent pair of teeth of said one of said members, and manually operable means for moving said bracket against the force of said spring means.

19. In a seat slide structure, in combination, a rail member and a slide member, one arranged for sliding movement longitudinally of the other, a plurality of teeth fixed with respect to one of said members, a bar member carried by the other of said members for sliding movement with respect thereto in a direction transverse to the length of said other member, a star wheel rotatably mounted on said bar member and movable bodily therewith, said star wheel being movable with said bar member to engage a tooth thereof between an adjacent pair of said teeth on said one of said members, said teeth on one of said members having substantially straight sides and the distance between adjacent faces of adjacent teeth becoming smaller toward that end thereof more remote from said star wheel, said star wheel having straight sided teeth tapered in accordance with the taper of the space between said teeth on said one of said members whereby when a tooth of said star wheel is fully engaged between an adjacent pair of said teeth on said one of said members said star wheel is locked against rotation on said bar member and when partially withdrawn from engagement between an adjacent pair of said teeth on said one of said members it is free to rotate, spring means constantly urging said bar member in a direction to effect full engagement of a tooth of said star wheel between a pair of adjacent teeth of said one of said membrs, and manually operable means for moving said brackets against the force of said spring means.

20. In a seat slide structure, in combination, a rail member and a slide member, one arranged for sliding movement longitudinally of the other, a plurality of teeth fixed with respect to one of said members, a bar member carried by the other of said members for sliding movement with respect thereto in a direction transverse to the length of said other member, a star wheel rotatably mounted on said bar member and movable bodily therewith, said star wheel being movable with said bar member to engage a tooth thereof between an adjacent pair of said teeth on said one of said members, the teeth of said one of said members and teeth of said star wheel being so constructed and arranged that when a tooth of said star wheel is fully engaged between an adjacent pair of teeth of said one of said members said star wheel is locked against rotation on said bar member and when partially disengaged said star wheel is free to rotate on said bar member, a bracket fixed to said other of said members, a member pivoted to said bracket, a pin and slot connection between said pivoted member and said bar member, spring means constantly urging said pivoted member in one direction of movement, and manually operable means for moving said pivoted member in the opposite direction of movement.

21. In a seat slide structure, in combination, a rail member and a slide member, one arranged for sliding movement longitudinally of the other, a plurality of teeth fixed with respect to one of said members, a bar member carried by the other of said members for sliding movement with respect thereto in a direction transverse to the length of said other member, a star wheel rotatably mounted on said bar member and movable bodily therewith, said star wheel being movable with said bar member to engage a tooth thereof between an adjacent pair of said teeth on said one of said members, the teeth of said one of said members and teeth of said star wheel being so constructed and arranged that when a tooth of said star wheel is fully engaged between an adjacent pair of teeth of said one of said members said star wheel is locked against rotation on said bar member and when partially disengaged said star wheel is free to rotate on said bar member, a bracket fixed to said other of said members, a member pivoted to said bracket, said bar member having a slot therein extending transversely of its direction of slidable movement in said other of said members, a pin on said pivoted member engaged in said slot, and means for effecting pivotal movement of said pivoted member.

BENJAMIN A. WOINA.